W. A. WHITNEY.
NUT LOCK.
APPLICATION FILED JUNE 7, 1907.

986,255.

Patented Mar. 7, 1911.

Witnesses:
G. A. Rauberschmidt
Earl F. Whitmore

Inventor:
William A. Whitney
By W. W. Morrison
Atty

UNITED STATES PATENT OFFICE.

WILLIAM A. WHITNEY, OF ROCKFORD, ILLINOIS.

NUT-LOCK.

986,255.  Specification of Letters Patent.  Patented Mar. 7, 1911.

Application filed June 7, 1907. Serial No. 377,822.

*To all whom it may concern:*

Be it known that I, WILLIAM A. WHITNEY, a citizen of the United States of America, residing at Rockford, in the county of Winnebago and State of Illinois, have invented certain new and useful Improvements in Nut-Locks, of which the following is a specification.

The object of my invention is to provide a nut-lock adapted for general use in securing nuts to bolts; and it consists of the features combinations and details of construction hereinafter described and claimed.

Figure 1:
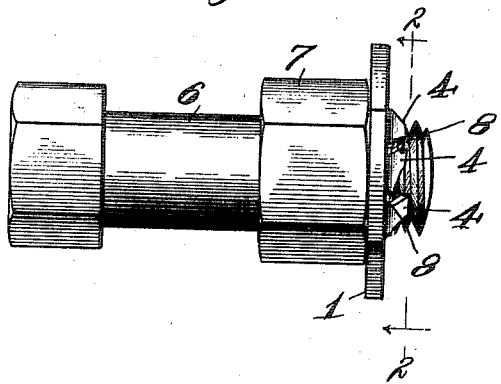
Figure 2:
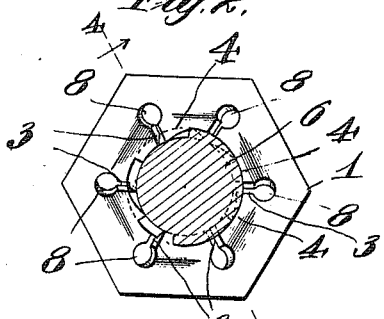
Figure 3:
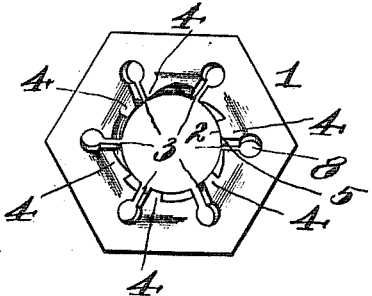
Figure 4:
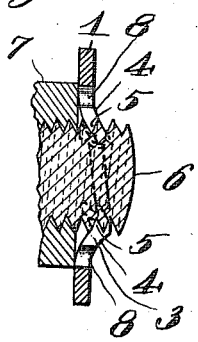
Figure 5:
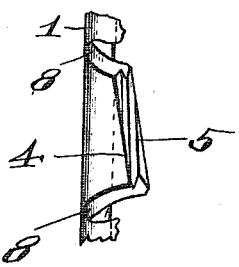

Referring to the accompanying drawings, which form a part of this specification, Figure 1 is a side view of a bolt having a nut secured thereon by means of a nut-lock embodying my invention. Fig. 2 is a top plan view of the nut-lock applied to the bolt with the latter sectioned away at the dotted line 2—2 in Fig. 1. Fig. 3 is a like view of the nut-lock detached from the bolt. Fig. 4 is a section, at the dotted line 4—4 in Fig. 2, through the threaded end of the bolt, the nut-lock and a fragment of the nut secured thereon. Fig. 5 is an enlarged detail view of one of the radial lugs of the nut-lock.

Like reference characters indicate corresponding parts throughout the several views.

1 is a flat ring having its inner-edge portion 2, Fig. 3, turned up and slotted radially outward, at 3, into the body thereby forming the radial lugs 4, which are bent laterally out of the plane of the plate, as shown in Fig. 5, and are permanently twisted from approximately one-sixty-fourth to one thirty-second of a circle Fig. 5, and thereafter threaded interiorly, 5, to receive a bolt 6. Twisting the lugs 4 causes the threads 5 thereon to act torsionally upon the corresponding threads of the bolt 6 as the nut-lock is turned against the nut 7 thereon, thereby increasing the frictional contact between said threads and aiding in locking the nut onto the bolt. As shown in Fig. 5 the ends of the twisted lugs 4 lie at an angle to the screw threads formed therein and therefore at an angle to the threads of the bolt.

8 are transverse perforations in the ring 1 at the outer ends of and continuous with the slots 4. The purpose of the perforations is to prevent the outer ends of the slots 3 from extending, by cracking, too far into the body of the metal comprising the ring. The perforations also insure the lugs 4 being bent up at the right point on the plate.

In use the nut-lock is applied to the threaded end of the bolt 6 and turned down very tightly against the nut 7 thereon. The resultant of the consequent resistance afforded by the nut 7 and the pressure communicated by the under sides of the threads 5 of the nut-lock will be to force the threaded inner ends of the lugs 4 downward and inward and thereby cause them to powerfully grip the correspondingly-threaded portions of the bolt and thus securely lock the nut thereon. Applying the nut-lock to the bolt 6 does not dislocate or in any manner injure its threads or the threads of the bolt, consequently it can be removed therefrom whenever it is desired to remove the nut.

Having fully described my invention, what I desire to claim as new and secure by Letters Patent is—

A nut lock consisting of a plate having a central circular opening formed therein and having a plurality of narrow slots extending radially outward from said opening into said plate, said slots forming relatively long tongues between them and the outer ends of said slots terminating in enlarged circular openings to prevent the slots from cracking farther out into the plate, said tongues being bent laterally out of the plane of the plate and being permanently twisted so that their ends lie at an angle with the threads of the bolt, the ends of said tongues being screw threaded to engage the threads of a bolt.

In testimony whereof I have signed my name to this specification in the presence of two subscribing witnesses.

WILLIAM A. WHITNEY.

Witnesses:
BURTON W. NORTON,
EARL F. WHITMORE.